United States Patent [19]

Yamada et al.

[11] Patent Number: 5,488,089
[45] Date of Patent: Jan. 30, 1996

[54] CURABLE RESIN COMPOSITION

[75] Inventors: Koji Yamada; Motoshi Yabuta, both of Hiratsuka, Japan

[73] Assignee: Kansai Paint Co., Ltd., Hyogo, Japan

[21] Appl. No.: 323,767

[22] Filed: Oct. 17, 1994

[30] Foreign Application Priority Data

Oct. 15, 1993 [JP] Japan .................. 5-280689
Dec. 17, 1993 [JP] Japan .................. 5-343264

[51] Int. Cl.⁶ .................................. C08F 283/02
[52] U.S. Cl. .................... 525/463; 525/65; 525/67; 525/327.3; 525/390; 525/396; 528/297; 528/299; 528/370; 528/371; 528/372
[58] Field of Search ............... 528/297, 299, 528/370, 371, 372; 525/327.3, 65, 67, 390, 396, 463

[56] References Cited

U.S. PATENT DOCUMENTS

| | | | |
|---|---|---|---|
| 4,126,737 | 11/1978 | Gruber et al. | 526/217 |
| 4,279,721 | 7/1981 | Kirchmayr et al. | 526/208 |
| 4,568,759 | 2/1986 | Pawloski | 549/518 |
| 4,746,725 | 5/1988 | Evans et al. | 528/370 |
| 4,880,874 | 11/1989 | Hirai et al. | 525/148 |
| 5,055,523 | 10/1991 | Inoue et al. | 525/67 |
| 5,105,006 | 4/1992 | Parker | 562/30 |
| 5,248,805 | 9/1993 | Boettcher et al. | 526/314 |
| 5,292,827 | 3/1994 | Raleigh et al. | 525/474 |

FOREIGN PATENT DOCUMENTS 5-34370  9/1987  Japan .

*Primary Examiner*—Melvyn I. Marquis
*Assistant Examiner*—Randy Gulakowski
*Attorney, Agent, or Firm*—Wenderoth, Lind & Ponack

[57] ABSTRACT

A curable resin composition, which is not thickened nor gels during storage, can be high solids, cures even at low temperatures and is excellent in electrostatic coating properties, and which contains as main components, a polymer having in one molecule epoxy group(s), and functional group(s) in each of which a carbonate ester group (—O—CO—O—) is directly bound to an aromatic ring; or a mixture of a compound having in one molecule at least two epoxy groups and a compound having in one molecule at least two functional groups in each of which a carbonate ester group (—O—CO—O—) is directly bound to an aromatic ring, and a curing reaction catalyst.

12 Claims, No Drawings

CURABLE RESIN COMPOSITION

BACKGROUND OF THE INVENTION

This invention relates to a novel curable resin composition useful particularly as a paint, which contains as a main component an epoxy group-containing polymer or compound which can be cured by crosslinking reaction.

Epoxy group-containing polymers or compounds react with crosslinking agents and are crosslinked and cured, and the resultant curing products have excellent performance, and therefore, are widely used in fields such as paints, adhesives and sealers. As the crosslinking agents can be used amines, polyaminoamides, acid anhydrides, phenol resins, urea resins, melamine resins, isocyanate compounds, blocked polyisocyanate compounds, etc. having functional group(s) capable of reacting with epoxy group(s).

However, at the time of reaction of the epoxy group-containing polymers or compounds with these crosslinking agents, the epoxy groups are ring-opened to form secondary hydroxyl groups; and the secondary hydroxyl groups remain as such and therefore become a cause to lower the water resistance and weather resistance of the curing products. Furthermore, these crosslinking agents, sometimes, react gradually with the epoxy group-containing polymers or compounds even at room temperature, and are thickened and gel, and thus curable resin compounds comprising both these components are insufficient in storage stability.

Crosslinkable polymer compositions in which epoxy group-containing polymers, polyfunctional active ester compounds and reaction accelerators are compounded have hitherto been proposed as those obviating these drawbacks (see Japanese Patent Publication No. 34370/1993). In the gazette, as the polyfunctional active ester compounds are exemplified phenyl esters, thiophenyl esters, halogenated phenyl esters, nitrophenyl esters, alkyl-substituted phenyl esters and naphthyl esters of aliphatic polyvalent carboxylic acids or aromatic polyvalent carboxylic acids; benzoate esters, acetate esters and propionate esters of polyhydric phenols; etc.

The present inventors have examined the crosslinkable polymer compositions, and as a result have found that in curing reaction of these compositions, there is no formation of secondary hydroxyl groups by ring opening of the epoxy groups, but in the case of the epoxy group-containing polymers and polyfunctional active ester compounds only, they are not sufficiently crosslinked and cured unless they are heated about 160° C., and in order to crosslink them at temperatures lower than the temperature, it is necessary to compound reaction accelerators such as trialkylamines and salts of crown ethers in large amounts, and as a result disadvantages arise that the electrical insulation properties of the compositions themselves are lowered, and there arise dangers at the time of electrostatic coating.

Further, as to the above crosslinkable polymer compositions, the compatibility of the polyfunctional active ester compounds, which are crosslinking agents, with organic solvents is not sufficient, and large amounts of the solvents are necessitated to give uniform solutions, and therefore, it is difficult to make the solutions high solids, and moreover use of large amounts of the solvents is also undesirable in view of the saving of resources and prevention of environmental pollution, etc.

The present inventors have intensely studied for the purpose of obviating the above-mentioned drawbacks of such a crosslinkable polymer composition as stated above which comprises epoxy group-containing polymers, polyfunctional active ester compounds and reaction accelerators, and with a view to developing a curable resin composition which has good storage stability at a room temperature, in which a crosslinking reaction rapidly takes place even at a temperature as low as about 100°–120° C. without any use of reaction accelerator in a large amount, and which has also good electrostatic coating properties. As a result, they have found that the purpose can be accomplished by, in place of use of the above active ester compounds as crosslinking agents, making functional group(s) in each of which a carbonate ester group (—O—CO—O—) is directly bound to an aromatic ring, coexist in the same molecule as the epoxy group-containing polymer.

It has further been found that when a compound having in one molecule at least two functional groups in each of which a carbonate ester group (—O—CO—O—) is directly bound to an aromatic ring, is used as a crosslinking agent for an epoxy group-containing compound, the crosslinking agent is not thickened nor gels in a mixed system with the epoxy group-containing compound during storage; and moreover the compound is excellent in solubility in organic solvents, it is possible to make the solutions high solids, and free secondary hydroxyl groups, etc. do not remain in the curing product.

SUMMARY OF THE INVENTION

Thus, according to one aspect of this invention is provided a curable resin composition which comprises as main components (A) a polymer (hereafter, referred to as component (A)) having, in one molecule, epoxy group(s), and functional group(s) in each of which a carbonate ester group (—O—CO—O—) is directly bound to an aromatic ring (hereafter, the functional group(s) is/are sometimes abbreviated as "carbonate ester group-containing functional group(s)"), and (B) a curing reaction catalyst (hereafter, referred to as component (B)).

According to another aspect of this invention is provided a curable resin composition which comprises as main components (a) a compound having in one molecule at least two epoxy groups (hereafter, referred to as component (a)), (b) a compound having in one molecule at least two functional groups in each of which a carbonate ester group (—O—CO—O—) is directly bound to an aromatic ring (hereafter, referred to as component (b)), and (c) a curing reaction catalyst (hereafter, referred to as component (c)).

DESCRIPTION OF THE INVENTION

The curable resin composition of the first embodiment of this invention is further detailedly described below.

Component (A): a polymer having epoxy group(s) and carbonate ester group-containing functional group(s) together in the same molecule In the "carbonate ester group-containing functional group(s)" of the component (A), it is necessary that one or both of the carbonate ester group (—O—CO—O—) is/are directly bound to ring carbon atom(s) composing an aromatic ring such as a benzene ring or a naphthalene ring; and in the case of a carbonate ester group-containing functional group in which both of the two valency bonds are bound to atoms other than ring carbon atoms composing aromatic rings, the above object of this invention cannot be accomplished.

The component (A) used in the curable resin composition of the first embodiment of this invention is a so-called self-crosslinking-type resin in which epoxy group(s) and carbonate ester group-containing functional group(s) coexist in the same molecule, and both these groups react intramolecularly and/or intermolecularly and are crosslinked and cured.

The component (A) can, for example, be obtained by copolymerizing (A-1) a glycidyl group-containing polymerizable unsaturated monomer having in one molecule respectively one or more glycidyl group(s) and polymerizable double bond(s), and (A-2) a polymerizable unsaturated monomer having in one molecule respectively one or more polymerizable double bond(s) and carbonate ester group-containing functional group(s) (hereafter, abbreviated as "carbonate ester group-containing unsaturated monomer"); or by copolymerizing the above monomers (A-1) and (A-2) and (A-3) another polymerizable unsaturated monomer.

As the above glycidyl group-containing polymerizable unsaturated monomers (A-1) can, for example, be used one or two or more monomers selected from glycidyl acrylate, glycidyl methacrylate, allyl glycidyl ether, etc.

The above carbonate ester group-containing unsaturated monomer (A-2) can, for example, be obtained by subjecting a hydroxyl group-containing polymerizable unsaturated monomer and an aryl halocabonate to dehydrohalogenation reaction. The hydroxyl group-containing polymerizable unsaturated monomer is a compound having in one molecule respectively one or more polymerizable double bond(s) and hydroxyl group(s), and includes, for example, monoester compounds from acrylic or methacrylic acid and a glycol having 2 to 20 carbon atoms such as hydroxyethyl acrylate, hydroxyethyl methacrylate, hydroxypropyl acrylate and hydroxypropyl methacrylate. It is also possible to use a compound having a terminal hydroxy group obtained by subjecting such a hydroxyl group-containing polymerizable unsaturated monomer and caprolactone or the like to ring-opening ester addition. The aryl halocarbonate is a compound in which a group represented by —O—CO—X is directly bound to a ring carbon atom composing an aromatic ring; and the aromatic ring is a benzene ring, a naphthalene ring, or the like, substituent(s) such as alkyl group(s) each having 1 to 20 carbon atoms, halogen atom(s) and/or nitro group(s) may, if desired, be bound to the aromatic ring, and X is a halogen atom and chlorine, bromine, etc. are particularly preferable. These aryl harocarbonates include, for example, phenyl chlorocarbonate, p-nitrophenyl chlorocarbonate, m-nitrophenyl chlorocarbonate, phenyl bromocarbonate, naphthyl chlorocarbonate, p-dodecylphenyl chlorocarbonate, etc.

The carbonate ester group-containing unsaturated monomers (A-2) obtained by reacting these two components include, for example, acryloyloxyethyl phenyl carbonate, methacryloyloxyethyl phenyl carbonate, acryloyloxybutyl phenyl carbonate, acryloyloxyethyl naphthyl carbonate, acryloyloxypropyl phenyl carbonate, etc., and these can be used alone or in combinations of two or more.

Another polymerizable unsaturated monomer (A-3), which can, if necessary, be used together with the above monomers (A-1) and (A-2) is a compound having one or more polymerizable double bond(s) in one molecule, and include, specifically for example, monoester compounds from acrylic acid or methacrylic acid and a monohydric alcohol having 1 to 20 carbon atoms such as methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate, octyl methacrylate, 2-ethylhexyl acrylate, 2-ethylhexyl methacrylate, lauryl acrylate and lauryl methacrylate; carboxyl group-containing monomers such as acrylic acid, methacrylic acid, maleic acid, fumaric acid, crotonic acid and glutaconic acid; monoester compounds from glycol having 2 to 10 carbon atoms and acrylic acid or methacrylic acid such as hydroxyethyl acrylate, hydroxyethyl methacrylate, hydroxypropyl acrylate and hydroxypropyl methacrylate; vinyl aromatic compounds such as styrene, α-methylstyrene and vinyltoluene; other monomers such as isocyanato group-containing unsaturated monomers, acrylonitrile, vinyl acetate, vinyl chloride, ethylene and acrylamide; etc.

The composition ratio of each of the above monomer components (A-1), (A-2) and (A-3) in preparation of the component (A) can freely be selected in accordance with physical properties desired from the component (A), etc, but generally, for example in the system comprising (A-1) and (A-2), it is preferable that (A-1) is within the range of 1 to 95%, particularly 5 to 90% by weight, and (A-2) is within the range of 99 to 5%, particularly 95 to 10% by weight, based on the total weight of both components. In the system where (A-3) is further used together, it is suitable to use (A-3) within the range of 5 to 500, particularly 10 to 200 weight parts per 100 weight parts of the total of (A-1) and (A-2) at the above rate.

Copolymerization of the above (A-1) and (A-2), and (A-3) when further used according to necessity can be carried out in the same manner as in preparation of polymers such as acrylic resins, known per se.

It is preferable that the component (A) thus prepared has, in general, a number average molecular weight within the range of 1,000 to 100,000, particularly 3,000 to 50,000. It is suitable that the epoxy group(s) and the carbonate ester group-containing functional group(s) exist in one molecule in numbers of one or more, preferably 5 to 100, particularly 20 to 80, respectively.

Component (B): curing reaction catalyst

This is a catalyst for accelerating self-crosslinking reaction between the epoxy group(s) and the carbonate ester group-containing functional group(s) in the component (A), and includes, for example, tetraalkylammonium halides such as tetraalkylammonium chlorides and tetraalkylammonium bromides; benzoate salts such as tetraalkylammonium benzoates and tetraalkylammonium m-chlorobenzoates; etc.

The curable resin composition of the first embodiment of this invention contains the above (A) and (B) as essential components, and the composition ratio of each of these components is not strictly limited and can be varied over a wide range in accordance with use of the composition, etc., but, in general, it is preferable to use the component (B) within the range of 0.1 to 100, particularly 0.5 to 10 weight parts per 100 weight parts of the component (A).

The curable resin composition of the first embodiment of this invention can be prepared by dissolving or dispersing the components (A) and (B), for example in an organic solvent or water or mixture thereof, and if necessary can further be compounded color pigments, metallic pigments, extender pigments, ultraviolet absorbers, etc.

In the curable resin composition of the first embodiment of this invention, the epoxy group(s) in the component (A) is ring-opened by self-crosslinking reaction between the epoxy group(s) and the carbonate ester group-containing functional group(s) therein, and secondary hydroxyl groups due to the ring opening reaction do not exist in the curing reaction product, and therefore, the water resistance, weather resistance, etc. of films formed by use of the composition of this invention do not lower. Further, since this crosslinking reaction is superior to the reaction when the above polyfunctional active ester compound is used, it is possible to make the compounding amount of the component (B) small; and as a result, the curable resin composition of the first embodiment of this invention can sufficiently be crosslinked and cured even at low temperatures of 100° to 120° C., and moreover, is also remarkably excellent in an aptitude for electrostatic coating.

Next, the above components (a), (b) and (c) composing the curable resin composition of the second embodiment of this invention are specifically described below.

Component (a): a compound having in one molecule at least two epoxy groups (or glycidyl groups)

The component (a), specifically, includes a polymer made only from a glycidyl group-containing polymerizable unsaturated monomer (a-1) having in one molecule respectively one or more glycidyl group(s) and polymerizable double bond(s), and a copolymer of the polymerizable unsaturated monomer (a-1) and another polymerizable unsaturated monomer (a-2).

As the glycidyl group-containing polymerizable unsaturated monomer (a-1) can, for example, be used one or two or more selected from glycidyl acrylate, glycidyl methacrylate, allyl glycidyl ether, etc. There is no particular limitation about said another polymerizable unsaturated monomer (a-2) so long as it is a monomer copolymerizable with the glycidyl group-containing polymerizable unsaturated monomer (a-1), and said another polymerizable unsaturated monomer (a-2) includes, for example, monoester compounds from acrylic or methacrylic acid and a monohydric alcohol having 1 to 20 carbon atoms such as methyl acrylate, methyl methacrylate, ethyl acrylate, ethyl methacrylate, propyl acrylate, propyl methacrylate, butyl acrylate, butyl methacrylate, hexyl acrylate, hexyl methacrylate, lauryl acrylate and lauryl methacrylate; carboxyl group-containing monomers such as acrylic acid, methacrylic acid, maleic acid, fumaric acid, crotonic acid and glutaconic acid; hydroxyl group-containing monomers which are monoester compounds from glycols each having 2 to 10 carbon atoms and acrylic or methacrylic acid such as hydroxyethyl acrylate, hydroxyethyl methacrylate, hydroxypropyl acrylate and hydroxypropyl methacrylate; vinyl aromatic compounds such as styrene, α-methylstyrene and vinyltoluene; other monomers such as acrylonitrile, vinyl acetate, vinyl chloride, ethylene and acrylamide; etc.

In polymerization of the monomer (a-1) alone or copolymerization of the monomer (a-1) and the monomer (a-2), the composition ratio of both monomers is not particularly limited so long as there are two or more, preferably 2 to 1,000, more preferably 10 to 500 epoxy groups in one molecule of the resultant (co)polymer, but, specifically, it is preferable that the monomer (a-1) is within the range of 5 to 100% by weight, particularly 10 to 80% by weight, and the monomer (a-2) is within the range of 0 to 95%, particularly 90 to 20% by weight, based on the total weight of both monomers. It is suitable that the number average molecular weight of the (co)polymer to be formed is within the range of generally about 1,000 to about 100,000, particularly about 5,000 to about 50,000.

As the components (a) can further be used a glycidyl ether-type epoxy resin obtained by reacting a phenol such as bisphenol A, F or AD, novolak phenol or cresol phenol with an epihalohydrin (e.g., epichlorohydrin or the like); a glycidyl ester resin obtained by reacting a polyvalent carboxylic acid selected from aliphatic polyvalent carboxylic acids, aromatic polyvalent carboxylic acids, alicyclic polyvalent carboxylic acids, etc. with an epihalohydrin; an alicyclic epoxy resin in which epoxy group(s) are directly bound to an alicyclic skeleton; or the like.

The epoxy group-containing compound of the component (a) contains in one molecule at least two, preferably 2 to 1,000, more preferably 10 to 500 epoxy groups, and it is suitable that the epoxy equivalent of the component (a) is within the range of generally 200 to 50,000, particularly 200 to 1,000.

Component (b): a compound having in one molecule at least two functional groups in each of which a carbonate ester group (—O—CO—O—) is directly bound to an aromatic ring (carbonate ester group-containing functional group)

As to the carbonate ester group (—O—CO—O—) in the "carbonate ester group-containing functional group" in the component (b), it is necessary for one or both thereof is/are directly bound to ring carbon atom(s) each composing an aromatic ring such as a benzene ring or a naphthalene ring; and in the case of a carbonate ester group-containing functional group in which both of the carbonate ester group are bound to atoms other than ring carbons composing aromatic rings, the above object of this invention cannot be accomplished; and the carbonate ester group-containing functional group(s) can exist at the terminus(-ni) of or in the middle of one or both of the principal chain and side chains composing the component (b).

It is necessary for the component (b) to have in one molecule the carbonate ester group-containing functional group in a number of at least two, preferably 3 to 100, more preferably 5 to 80, and it is not preferable that the number is less than two, because curability of the composition formed lowers.

The component (b) can be prepared by processes described below, but is not limited only to those prepared thereby.

① Process comprising reacting an aryl halocarbonate with a dihydric to tetrahydric aliphatic or alicyclic alcohol:

As the aryl halocarbonate can be used a compound in which a group represented by —O—CO—X is directly bound to a carbon atom composing an aromatic ring; therein the aromatic ring is a benzene ring or a naphthalene ring; these rings may, if desired, be substituted with alkyl group(s) having 1 to 20 carbon atoms, halogen atom(s), nitro group(s) or the like; and X is a halogen atom and particularly preferred are chlorine, bromine, etc. These aryl halocarbonates include, for example, phenyl chlorocarbonate, phenyl bromocarbonate, p-tolyl chlorocarbonate, p-nitrophenyl chlorocarbonate, 1-naphthyl chlorocarbonate, etc.

The dihydric to tetrahydric aliphatic (or alicyclic) alcohol includes a compound having in one molecule 2 to 4 hydroxyl groups in which hydrogen atoms of an aliphatic hydrocarbon or alicyclic hydrocarbon having 2 to 20, preferably 4 to 16 carbon atoms are replaced with hydroxyl groups. Specifically, the aliphatic alcohol includes ethylene glycol, 1,4-butanediol, 1,6-hexanediol, glycerol, pentaerythritol, trimethylolpropane, 1,2,6-hexanetriol, etc.; and the alicyclic alcohol includes 1,3-cyclohexanediol, 1,4-cyclohexanediol, 1,4-cyclohexanedimethanol, etc.

The reaction ratio of both of the above components for preparing the component (b) is, most preferably, almost one mole of the aryl halocarbonate per mole of the hydroxy groups of the dihydric to tetrahydric aliphatic or alicyclic alcohol.

The component (b) obtainable by the above process includes, for example, ethylene glycol diphenyl dicarbonate, 1,6-hexanediol diphenyl dicarbonate, glycerol triphenyl tricarbonate, pentaerythritol tetraphenyl tetracarbonate, trimethylolpropane triphenyl tricarbonate, 1,4-cyclohexanediol di(p-nitrophenyl) dicarbonate, etc.

② Process comprising reacting an aryl halocarbonate with a monohydric to tetrahydric aromatic alcohol (a phenol):

As the aryl halocarbonate can be used those exemplified in the above ①. The aromatic alcohol includes a compound having in one molecule 1 to 5, preferably 1 to 2 benzene and/or naphthalene ring(s), and having in one molecule 1 to 4, preferably 1 to 3 hydroxyl group(s); and these compounds include, for example, cresols, p-nitrophenol, catechol, resorcinol, hydroquinone, bisphenols (bisphenol A, bisphenol F, etc.), naphthalenediol, 1,3,5-benzenetriol, 1,2,4-benzenetriol, pyrogallol, etc.

The reaction ratio of both of the above components for preparing the component (b) is, most preferably, the rate of almost one mole of the aryl halocarbonate per mole of the hydroxyl group(s) of the aromatic alcohol.

The component (b) obtainable by the above process includes, for example, diphenyl carbonate, hydroquinone diphenyl dicarbonate, 4,4'-isopropylidenediphenol diphenyl dicarbonate, phenyl p-nitrophenyl carbonate, 1,5-naphthalene diphenyl dicarbonate, etc.

③ Process comprising reacting an alkyl halocarbonate compound in which a group represented by —O—CO—X is directly bound to a carbon atom composing an aliphatic hydrocarbon or alicyclic hydrocarbon, with a dihydric to tetrahydric aromatic alcohol:

The aliphatic hydrocarbon or alicyclic hydrocarbon in the alkyl halocarbonate compound has 1 to 20, preferably 1 to 8 carbon atoms, and may, if desired, be substituted with halogen atom(s), nitro group(s) or the like. The X is a halogen atom, and chlorine, bromine, etc. are particularly preferable. The alkyl halocarbonate compound includes, for example, alkyl chlorocarbonate esters such as methyl chlorocarbonate, ethyl chlorocarbonate, propyl chlorocarbonate, isopropyl chlorocarbonate, butyl chlorocarbonate, isobutyl chlorocarbonate, hexyl chlorocarbonate, octyl chlorocarbonate and 2-ethylhexyl chlorocarbonate.

The dihydric to tetrahydric aromatic alcohols include those having 2 to 4 hydroxyl groups among the monovalent to tetravalent aromatic alcohols exemplified in the above ②.

The reaction ratio of the above two components for preparing the component (b) is, most preferably, almost one mole of the alkyl halocarbonate compound per mole of the hydroxyl groups of the dihydric to tetrahydric aromatic alcohol.

④ Process comprising reacting a bisphenol compound with phosgene ($COCl_2$):

As the bisphenol compound can, for example, be used bisphenol A, bisphenol F, bisphenol AD, 4,4'-dihydroxydiphenyl- 1,1-cyclohexane (bisphenol Z), etc.

The reaction ratio of the above two components for preparing the component (b) is within the range of 0.5 to 3 moles, most preferably about one mole of phosgene per about one mole of the bisphenol compound.

⑤ Process comprising polymerizing a polymerizable unsaturated monomer having in one molecule respectively one or more polymerizable double bond(s) and carbonate ester group-containing functional group(s) (hereafter, sometimes abbreviated as "carbonate ester group-containing unsaturated monomer") alone, or copolymerizing the carbonate ester group-containing unsaturated monomer with another polymerizable unsaturated monomer:

The carbonate ester group-containing unsaturated monomer is a polymerizable unsaturated monomer having in one molecule respectively one or more polymerizable double bond(s) and carbonate ester group-containing functional group(s); and can, for example, be obtained by subjecting a hydroxyl group-containing polymerizable unsaturated monomer and an aryl halocarbonate to dehydrohalogenation reaction.

The hydroxyl group-containing polymerizable unsaturated monomer is a compound having in one molecule respectively one or more polymerizable double bond(s) and hydroxyl group(s); and includes, for example, monoester compounds from acrylic or methacrylic acid and glycols having 2 to 20 carbon atoms such as hydroxyethyl acrylate, hydroxyethyl methacrylate, hydroxypropyl acrylate and hydroxypropyl methacrylate. As the hydroxy group-containing polymerizable unsaturated monomer can further also be used a compound having hydroxyl group(s) at the terminus(-ni) obtained by ring-opening ester adding caprolactone or the like to such a hydroxyl group-containing polymerizable unsaturated monomer. As the aryl halocarbonate can be used compounds in each of which a group represented by —O—CO—X is directly bound to a carbon atom composing an aromatic ring, and specifically, those exemplified in the above ① can be used.

The carbonate ester group-containing unsaturated monomer obtainable by reacting these two components includes, for example, acryloyloxyethyl phenyl carbonate, methacryloyloxyethyl phenyl carbonate, acryloyloxybutyl phenyl carbonate, acryloyloxyethyl naphthyl carbonate, acryloyloxypropyl phenyl carbonate, etc., and these can be used alone or in combination of two or more.

Said another polymerizable unsaturated monomer which can be copolymerized with the carbonate ester group-containing unsaturated monomer, is a compound, other than the carbonate ester group-containing unsaturated monomer, having in one molecule one or more polymerizable double bond(s). Specifically included are monoesters from acrylic or methacrylic acid and a monohydric alcohol having 1 to 20 carbon atoms such as methyl acrylate, methyl methacrylate, ethyl acrylate, ethyl methacrylate, propyl acrylate, propyl methacrylate, butyl acrylate, butyl methacrylate, hexyl acrylate, hexyl methacrylate, lauryl acrylate and lauryl methacrylate; carboxyl group-containing monomers such as acrylic acid, methacrylic acid, maleic acid, fumaric acid, crotonic acid and glutaconic acid; hydroxyl group-containing monomers which are monoesters compounds from glycols each having 2 to 10 carbon atoms and acrylic or methacrylic acid such as hydroxyethyl acrylate, hydroxyethyl methacrylate, hydroxypropyl acrylate and hydroxypropyl methacrylate; vinyl aromatic compounds such as styrene, α-methylstyrene and vinyltoluene; other monomers such as isocyanate group-containing unsaturated monomers, acrylonitrile, vinyl acetate, vinyl chloride, ethylene and acrylamide; etc.

In this process of ⑤, the component (b) can be obtained by polymerizing the carbonate ester group-containing unsaturated monomer alone, or copolymerizing the carbonate ester group-containing unsaturated monomer with said another polymerizable monomer. The ratio of the two monomer components when the copolymerization is carried out is not particularly limited so long as it is within such a range that the carbonate ester group-containing functional group exists in a number of 2 or more in the resultant copolymer molecule, and specifically, it is preferable that based on the total weight of the two monomer components, the carbonate ester group-containing unsaturated monomer is within the range of 3 to less than 100%, particularly 10 to 95% by weight, and said another polymerizable monomer is within the range of more than 0 to 97%, particularly 90 to 5% by weight. Further, it is suitable that the component (b) obtained by the process of ⑤ is one whose number average molecular weight is within the range of generally about 1,000 to about 100,000, particularly 3,000 to 50,000.

Component (c): curing reaction catalyst

This is a component for accelerating crosslinking reaction between the component (a) and the component (b), and includes, for example, tetraalkylammonium halides such as tetraalkylammonium chloride and tetraalkylammonium bromide; benzoate salts such as tetraalkylammonium benzoate and tetraalkylammonium m-chlorobenzoate; etc.

The curable resin composition of the second embodiment of this invention contains, as essential components, the three components of the above-mentioned (a), (b) and (c); and the composition ratio of these components is not strictly limited and can be varied over a wide range in accordance with its use, etc., but generally, based on the total weight of the component (a) and the component (b), the component (a) can be in the range of 5 to 95%, particularly 20 to 80% by weight, and the component (b) can be in the range of 95 to 5%, particularly 80 to 20% by weight.

It is preferable to use the component (c) in the range of 0.1 to 10, particularly 0.2 to 5 weight parts per 100 weight parts of the total of the component (a) and the component (b).

The curable resin composition of the second embodiment of this invention can be prepared by dissolving or dispersing the components (a), (b) and (c), for example in an organic solvent or water or a mixture thereof; and further it is possible to compound color pigments, metallic pigments, extender pigments, ultraviolet absorbers, etc., in accordance with necessity.

The thus described curable resin composition of the second embodiment of this invention exhibits the following effects.

(1) The epoxy groups of the component (a) is ring-opened by crosslinking reaction between the component (a) and the component (b), but there is no secondary hydroxyl group by the ring opening reaction in the curing reaction product, and therefore, films formed using the composition of this invention are excellent in water resistance, weather resistance, etc.

(2) Since the crosslinking reaction between the component (a) and the component (b) is superior to crosslinking reaction when the above-mentioned active ester compound having an ester bond (—O—CO—) is used, it is possible to make the compounding amount of the component (c) small; and as a result, the composition of this invention can sufficiently be crosslinked and cured even at low temperatures of the order of 100° to 120° C., and moreover, is also remarkably excellent in an aptitude for electrostatic coating.

(3) Since the component (a) and the component (b) are excellent in solubility in organic solvents, etc., and can be made to be uniform solutions with small amounts of solvents, the composition of this invention is easily made to be high solids, and is preferable in view of the saving of resources and prevention of environmental pollution, etc.

The thus described curable resin compositions of the first and second embodiments of this invention can be used as top coat paints and intercoat paints for automobiles, paints for precoat metals, sealers, adhesives, etc.

DESCRIPTION OF THE PREFERRED EMBODIMENTS

This invention is further specifically described below by examples, but this invention is not limited to these examples alone. Both of the parts and % are based on weight unless otherwise defined.

EXAMPLE 1

4 parts of 8% tetrahydrofuran solution of tetrabutylammonium m-chlorobenzoate was added to 30 parts of 50% xylene solution of a copolymer (number average molecular weight: 30,000) obtained by polymerizing a monomer component consisting of 20% styrene, 25% n-butyl acrylate, 12% 2-ethylhexyl methacrylate, 15% glycidyl methacrylate and 28% acryloyloxybutyl carbonate; and the mixture was uniformly mixed.

The mixture was applied onto a tin plate so as to be a constant film thickness, and cured with heating at 120° C. for 30 minutes. The resultant film was peeled, but in an equal weight mixture of acetone and methanol and boiled for 6 hours; the % by weight of the insoluble part was measured and thereby the gel fraction was determined to be 97%. The electrostatic coating properties of the film were also mood.

EXAMPLE 2

0.9 part of 20% methyl ethyl ketone solution of tetrabutylammonium bromide was added to 30 parts of 60% xylene solution of a copolymer (number average molecular weight: 20,000) obtained by polymerizing a monomer component consisting of 30% styrene, 23% n-butyl acrylate, 17% glycidyl methacrylate and 30% methacryloyloxyphenyl carbonate; and the mixture was uniformly mixed.

The mixture was applied onto a tin plate so as to be a constant film thickness, and cured with heating at 100° C. for 30 minutes. The resultant film was peeled, but in an equal weight mixture of acetone and methanol and boiled for 6 hours; the % by weight of the insoluble part was measured and thereby the gel fraction was determined to be 93%. The electrostatic coating properties of the film were also Mood.

EXAMPLE 3

A mixture was prepared in the same manner as in Example 2, and cured by heating at 120° C. for 30 minutes. The gel fraction of the resultant film was 98%.

EXAMPLE 4

A mixture was prepared in the same manner as in Example 2, and cured by heating at 140° C. for 30 minutes. The gel fraction of the resultant film was 99%.

EXAMPLE 5

15 g of 40% toluene solution of diphenyl carbonate and 2.4 g of 20% methyl ethyl ketone solution of tetrabutylammonium bromide were added to 36.3 g of 50% xylene solution of a copolymer (Mw=10,000) of 44 mol % glycidyl methacrylate and 56 mol % n-butyl methacrylate; and the mixture was uniformly mixed. The mixture was applied onto a tin plate so as to be a constant film thickness, and baked at 120° C. for 30 minutes. The resultant film was peeled and boiled for 6 hours in a mixed solvent of 100 g of acetone and 100 g of methanol to elute the soluble components. The gel fraction was determined based on the weight of the insoluble components to be 96%.

EXAMPLE 6

15 g of 40% toluene solution of diphenyl carbonate and 1.5 g of 8% tetrahydrofuran solution of tetrabutylammonium m-chlorobenzoate were added to 36.3 g of the same copolymer solution as used in Example 5; the mixture was uniformly mixed; the film was prepared in the same manner as in Example 5; and the gel fraction thereof was determined to be 95%.

EXAMPLE 7

6.6 g of 4,4'-isopropylidenediphenol diphenyl dicarbonate and 2.4 g of 20% methyl ethyl ketone solution of tetrabutylammonium bromide were uniformly mixed with 36.3 g of the same copolymer solution as used in Example 5; film was prepared in the same manner as in Example 5; and the gel fraction thereof was determined to be 98%.

EXAMPLE 8

15.1 g of glycerol triphenyl tricarbonate, 30 g of methyl ethyl ketone and 1.5 of 20% methyl ethyl ketone solution of tetrabutylammonium bromide were uniformly mixed with 19 g of Araldite GY-260 (produced by CIBA-GEIGY; diglycidyl ether of bisphenol A); and the mixture was applied onto a Teflon plate so as to be a constant film thickness and baked at 140° C. for 30 minutes. The gel fraction of the film obtained in the same manner as in Example 5 was determined to be 96%.

EXAMPLE 9

9.3 g of 1,4-butanediol diphenyl dicarbonate was added to 36.3 g of the same polymer solution as used in Example 5. 15 g of methyl ethyl ketone was further required to completely dissolve it. 2.4 of 20% methyl ethyl ketone solution of tetrabutylammonium bromide was added thereto, and the mixture was uniformly mixed. The heating residue of the resultant solution was 44%. Film was prepared by spray thereof, and a uniform coat having a film thickness of 55 microns. The gel fraction of the film was determined in the same manner as in Example 5 to be 95%.

Comparative example 1

8.4 g of diphenyl adipate was added to 36.3 g of the same copolymer solution as used in Example 5, and 172 g of methyl ethyl ketone was further required to completely dissolve it. 2.4 g of 20% methyl ethyl ketone solution of tetrabutylammonium bromide was uniformly mixed therewith. The heating residue of the resultant paint was 12%. Film was prepared by spray thereof under the same conditions as in Example 5, but a uniform coat was not obtained. Further, in proportion to volatilization of the solvent, part of the diphenyl adipate was deposited. Film was prepared in the same manner as in Example 5 using the paint, and its gel fraction was determined to be 91%.

Comparative example 2

3.3 g of diethyl carbonate was added to 36.3 g of the same copolymer solution as used in Example 5. 2.4 g of 20% methyl ethyl ketone solution of tetrabutylammonium bromide was added thereto, and the mixture was uniformly mixed. Gel fraction was determined in the same manner as in Example 5 using this to be 0%.

Comparative example 3

2.9 g of propylene carbonate was added to 36.3 g of the same copolymer solution as used in Example 5. 2.4 g of 20% methyl ethyl ketone solution of tetrabutylammonium bromide was added thereto, and the mixture was uniformly mixed. Gel fraction was determined in the same manner as in Example 5 using this to be 0%.

What is claimed is:

1. A curable resin composition which comprises as main components (A) a polymer having, in one molecule, epoxy group(s), and functional group(s) in each of which a carbonate ester group (—O—CO—O—) is directly bound to an aromatic ring, and (B) a curing reaction catalyst.

2. The composition according to claim 1 wherein the polymer (A) is one having, in one molecule, the epoxy groups and the functional groups in numbers of 5 to 100, respectively.

3. The composition according to claim 1 wherein the polymer (A) is one having a number average molecular weight within the range of 1,000 to 100,000.

4. The composition according to claim 1 wherein the polymer (A) is one having a number average molecular weight within the range of 3,000 to 50,000.

5. The composition according to claim 1 wherein the polymer (A) is one obtained by copolymerization of (A-1) a glycidyl group-containing polymerizable unsaturated monomer having in one molecule respectively one or more glycidyl group(s) and polymerizable double bond(s); and (A-2) a polymerizable unsaturated monomer having in one molecule respectively one or more polymerizable double bond(s), and functional group(s) in each of which a carbonate ester group is directly bound to an aromatic ring; and, if desired, (A-3) another polymerizable unsaturated monomer.

6. The composition according to claim 5 wherein the polymer (A) is one obtained by copolymerization of 1 to 95% by weight of the monomer (A-1), and 99 to 5% by weight of the monomer (A-2).

7. The composition according to claim 5 wherein the polymer (A) is one obtained by copolymerization of 5 to 90% by weight of the monomer (A-1), and 95 to 10% by weight of the monomer (A-2).

8. The composition according to claim 5 wherein the polymer (A) is one obtained by copolymerization of 1 to 95% by weight of the monomer (A-1); 99 to 5% by weight of the monomer (A-2); and 5 to 500 weight parts of the monomer (A-3) per 100 weight parts of the total of the monomers (A-1) and (A-2).

9. The composition according to claim 5 wherein the polymer (A) is one obtained by copolymerization of 5 to 90% by weight of the monomer (A-1); 95 to 10% by weight of the monomer (A-2); and 10 to 200 weight parts of the monomer (A-3) per 100 weight parts of the total of the monomers (A-1) and (A-2).

10. The composition according to claim 1 wherein the curing reaction catalyst (B) is selected from the group consisting of a tetraalkylammonium halide and a benzoate salt.

11. The composition according to claim 1 which contains the curing reaction catalyst (B) within the range of 0.1 to 100 weight parts per 100 weight parts of the polymer (A).

12. The composition according to claim 1 which contains the curing reaction catalyst (B) within the range of 0.5% to 10 weight parts per 100 weight parts of the polymer (A).

* * * * *